United States Patent [19]

Mullett

[11] 4,219,963
[45] Sep. 2, 1980

[54] AUTOMATIC SPRAYING SECATEUR

[75] Inventor: Leslie F. Mullett, 29 Grantley Ave., Victor Harbour, Australia

[73] Assignees: Leslie Fred Mullett, Victor Harbour; The University of Adelaide, Adelaide, both of Australia

[21] Appl. No.: 914,208

[22] Filed: Jun. 12, 1978

[51] Int. Cl.² .............................................. A01G 3/03
[52] U.S. Cl. ..................................... 47/1 R; 137/539; 30/123.3
[58] Field of Search ....................... 47/1, 12, DIG. 13; 30/123.3; 137/539

[56]  References Cited
U.S. PATENT DOCUMENTS

| 773,743 | 11/1904 | Von Hoffman | 47/1 |
| 1,056,046 | 3/1913 | Myers | 47/1 |
| 1,264,441 | 4/1918 | Rue | 47/1 |
| 2,600,540 | 6/1952 | Johnson | 47/1 |
| 2,747,330 | 5/1956 | Simpkins | 47/1 |

Primary Examiner—Robert E. Bagwill
Attorney, Agent, or Firm—Norbert P. Holler

[57] ABSTRACT

A pneumatically operated secateur provided with a nozzle which emits a spray of protective fluid through the nozzle when the secateur operating trigger is released. The spray is emitted in a metered quantity from a pump when mixed with the escaped air from the secateur. The method involves an operator holding a finger on the trigger until the nozzle has been directed on the wound caused by pruning, and then releasing his finger to spray the wound with protective fluid.

8 Claims, 4 Drawing Figures

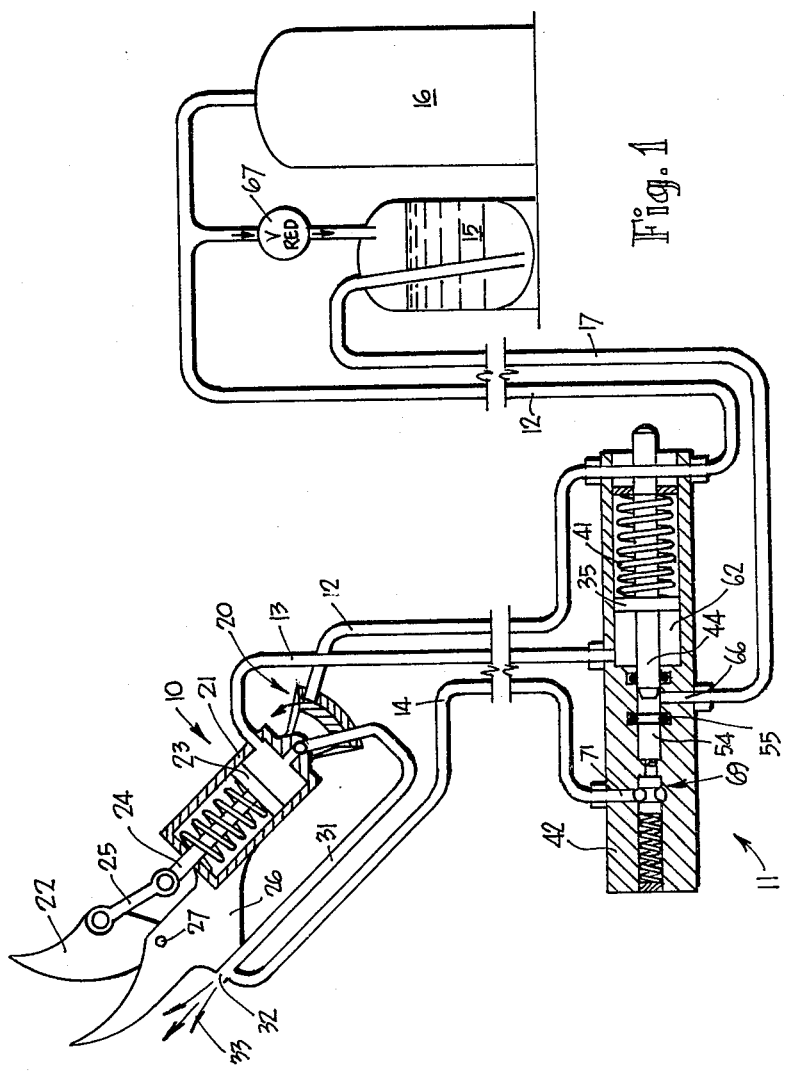

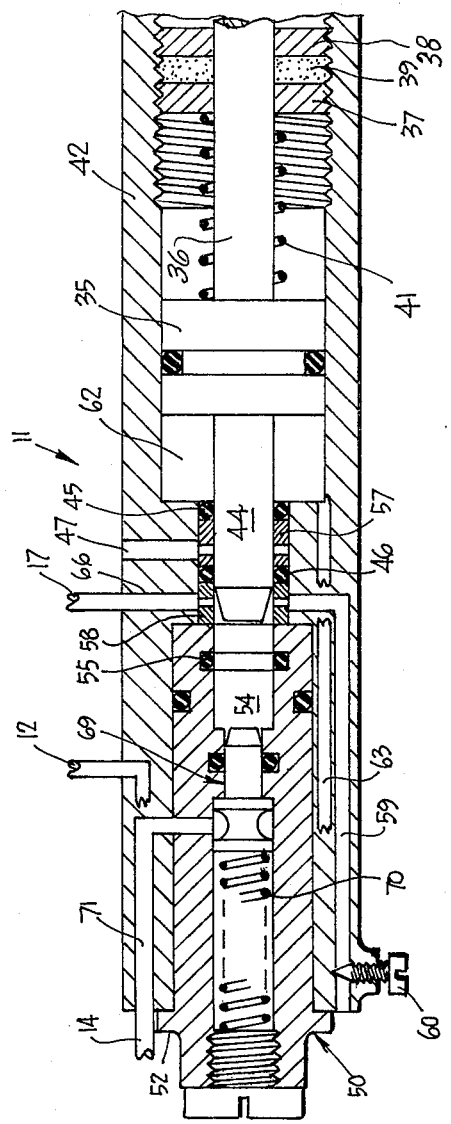
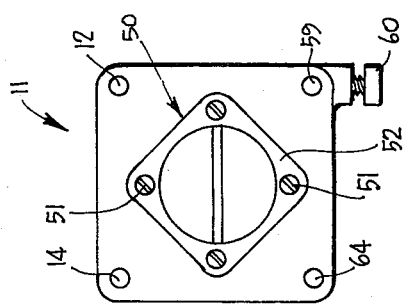

AUTOMATIC SPRAYING SECATEUR

This invention relates to an automatic spraying secateur.

BACKGROUND OF THE INVENTION

Certain diseases are known to infect vines and fruit trees shortly after pruning, when the wound is fresh. For example the disease Eutypa in apricot trees and grape vines, variously known as "gummosis", "dieback" and "dying arm", has been found to be transmitted in many instances immediately after pruning, and efforts which have been made heretofore to control such infection have not been very satisfactory. A suitable protective spray is known, but it is necessary for the spray to be applied to the wound in relatively concentrated form and within a short period of time after the wound has been made by the pruning operation. Traditional mass spraying techniques, such as cloud misting projectors and aircraft delivery have been shown to be ineffective. Another known disease which also requires rapid treatment after pruning is Silverleaf, a disease of stone and pome fruits.

The main object of this invention is to provide a secateur having spraying facilities thereon so that a wound can be treated immediately after it has been made by pruning. A second object is to provide a secateur which will be very quick in its operation of applying a quantity of fluid. A still further object is to provide means whereby the quantity of fluid may be accurately metered. A still further object is to provide improvements whereby the deleterious effects of winds, for example a strong cross wind, are likely to be reduced in respect to previously known techniques.

BRIEF SUMMARY OF THE INVENTION

Briefly in this invention a secateur is provided with a nozzle which is arranged for emitting a spray of protective fluid, the nozzle being carried on a secateur, and being coupled to spray impelling means in such a way that upon movement of the secateur blades to a blade re-setting position, the spray is emitted from the nozzle.

With this invention, an operator can utilise a secateur, for example a pneumatically operated secateur, to sever a branch from a tree or vine, and by merely directing the nozzle as the blades return to their re-setting position, apply a spray of protective fluid to the wound which has been made to the tree or vine.

More specifically, in this invention a secateur comprises a pair of blades, means retaining the blades for shearing movement relative to each other, actuating means coupled to respective said blades and operable to effect said shearing movement, a conduit terminating at one end in a spray emitting nozzle, means securing the conduit near its said end with respect to one of said blades, and spray impelling means operatively coupled to said actuating means and operable to effect emission of liquid spray from said conduit and through said nozzle upon reversal of said actuating means to a blade resetting position.

BRIEF DESCRIPTION OF THE DRAWINGS

An embodiment is described hereunder with reference to and is illustrated in the accompanying drawings in which:

FIG. 1 is a schematic drawing which illustrates the secateur and its control apparatus.

FIG. 2 is a section through a pump unit which is utilised with the secateur and which incorporates liquid pumping and metering means, FIG. 3 is an end elevation of FIG. 2.

Figure 4:
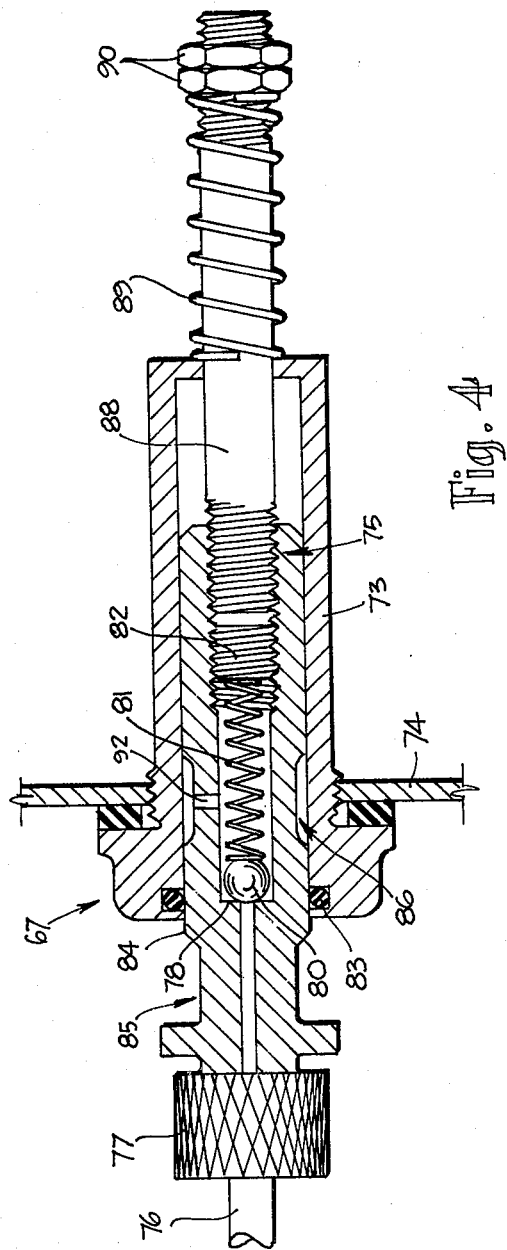
FIG. 4 is a section through a pressure regulating valve.

Referring first to FIG. 1, a secateur comprises a hand piece 10, and a pump assembly 11. They are interconnected by three conduits designated 12, 13 and 14, and are further connected respectively to a fluid tank 15 which contains a supply of protective fluid, and an air tank 16 which contains air at super-atmospheric pressure, respectively through the conduits 17 and 12. The reason conduit 12 extends from the hand gun to the pump assembly 11 and from the pump assembly 11 to the air tank 16 is that the pump assembly 11 is conveniently a lightweight assembly which can be carried by an operator in a pouch on his belt, and if the conduits 12, 13, 14 and 17 are relatively small bore and flexible, the hand piece 10 is easily operated and it is not necessary for the operator to use a great deal of physical strength, which otherwise might be required to manipulate a heavy hand piece or to flex heavy hoses.

The hand piece 10 is provided with a changeover air valve designated 20 which transfers air at super-atmospheric pressure into a cylinder 21 of a piston/cylinder combination which drives a movable shearing blade 22, by its piston 23, coupling rod 24 and link 25. Cylinder 21 also has a blade 26 fixed to it by known means (not shown), and a hinge pin 27 retains the blades 22 and 26 for shearing movement relative to each other. Insofar as the hand piece 10 has been described heretofore, it is in accordance with known art excepting for details of construction of the valve 20. The valve 20 in the position shown in FIG. 1 of the drawings allows spring return of cylinder 21 to open the blades to a re-set position, and directs exhaust air contained in the cylinder 21, and also in the conduit 13 and in the pump assembly 11, through an exhaust conduit 31 which terminates at its exhaust end in a nozzle 32 arranged to direct a relatively narrow angled cone of spray 33 substantially in the same plane as the fixed blade 26. While it is possible to arrange the position of the exhaust conduit 31 in any one of a number of positions on the blade 26, the central position shown in FIG. 1 is preferred since this enables the hand piece to be used equally effectively by both left and right handed operators.

Reference is now made to the pump unit 11 which is illustrated diagrammatically in FIG. 1 but in more detail in FIGS. 2 and 3.

The pump unit 11 comprises a pressure multiplier, there being provided an air actuated piston 35 positioned intermediate the ends of a spindle 36. The outer end of the spindle 36 passes through a pair of threaded bushes 37 and 38, between which is provided a lubricant soaked felt washer 39 which functions to distribute some lubricating substances to the relatively moving surfaces of the pump. A pump actuating spring 41 bears between the threaded bush 37 and the piston 35 to drive the piston inwardly into the body 42 of the pump assembly 11, and the amount of force imparted by spring 41 can be adjusted by adjusting the threaded bushes 37 and 38.

The inner end of spindle 36, designated 44, functions as a small diameter piston, and slidably and sealably engages two sealing rings 45 and 46 between which is an exhaust aperture 47 which opens to the atmosphere through the pump body 42 so that any escaping fluid from either of the rings 45 or 46 is immediately released. Thus the inner end 44 of spindle 36 becomes a liquid actuating pump piston and is referred to hereinafter with that terminology.

The end which, in FIG. 2, is the left hand end of the pump assembly 11 sealably contains an insert designated 50 retained therein by screws 51 on an outstanding flange 52, and the innermost end of the insert 50 contains a resess defined by cylinder walls 54, and in said walls 54 is a sealing ring 55. Between the sealing rings 45 and 46 is a perforate spacer 57, and at the end of the insert 50 but within the body 11 is a second perforate spacer 58, and the second perforate spacer 58 is in communication with the passage 59 through the body 11, which said passage 59 can be opened to the atmosphere through a needle valve 60, for purging of line 17 in the system.

The air piston 35 cooperates with cylindrical walls designated 62 in the pump body 42 to form an air actuated piston arrangement, and air is introduced into the cylindrical portion 62 through an air passage designated 63 extending through the pump body 42 from a port 64 (FIG. 3) in the body, and the port 64 communicates via conduit 13 with the space in the cylinder 21 of hand piece 10 which receives air at pressure upon operation of valve 20. The arrangement is such that when valve 20 is operated, the air at pressure from the tank 16 extends via conduit 12, through valve 20, into cylinder 21 and then through conduit 13 into the cylinder 62. This drives the piston 35 outwardly, against the pressure of the spring 41. At the same time the liquid pump piston 44 is withdrawn from its cylinder 54 in its aspirating stroke and this induces an inward flow of liquid through a passage 66 in the body 42, which said passage communicates by the conduit 17 to the fluid tank 15. This liquid flow is assisted by pressure air from the air tank 16 above the fluid in the fluid tank 15, introduced by means of a pressure reducing valve 67 which is described hereunder in some further detail with respect to FIG. 4.

The insert 50 contains in it a spring loaded poppet valve 69, and as the spring 41 drives the piston 35 inwardly (when valve 20 is in the position shown in FIG. 1), there is initially some lost motion of the liquid actuating pump piston 44 during the initial part of its pumping stroke, but after the pump piston 44 seals against the sealing ring 55, the remaining fluid in the cylinder 54 is placed under high pressure which lifts poppet valve 69 from its seat against the spring 70, and liquid contained in cylinder 54 passes outwardly through passage 71 in body 42, passsage 71 communicating with conduit 14. In this manner a metered quantity of liquid passes into the nozzle 32 simultaneously with the exhaust air passing from the cylinder 21 of the hand piece 10, and this combination makes it possible to accurately meter the quantity of liquid discharged, at the same time discharging it as spray 33, and this in turn provides a relatively even distribution of liquid over the area of the spray. It should be noted at this point that the spray is not released until such time as the operator releases the "trigger" of the hand piece 10 (not shown herein), so that the operator has time after having severed a branch or cane from a tree or vine to direct the nozzle 32 at the wound.

Reference is now made to the pressure reducing valve 67 which is illustrated in detail in FIG. 4. For pressure reducing purposes, use can be made of a diaphragm actuated regulator or other known type of pressure regulator. However, in this invention there is a requirement that excessive quantities of pressure air from the air tank 16 should not leak into the fluid tank 15 thereby building up pressure since such build up of pressure will result in excessive pressure being imparted to the poppet valve 69, and a consequential risk of excessive quantities of liquid passing into the conduit 14, or alternatively, liquid dribbling from conduit 14 between successive usages of the hand piece 11. In this invention the valve 67 functions as an overload safety valve, as a manual pressure release valve, and also as an automatic pressure release valve when the main high pressure air is disconnected, in addition to the aforementioned function of pressure regulator. The valve 67 is constructed as follows:

A housing 73 is hermetically sealed into the wall 74 of the tank 15, preferably in the filling cap. This housing is bored to receive a close-fitting sliding member 75 to which is attached the high pressure air tube 76 by a suitable spigot and nut assembly 77. Member 75 is bored for the axial flow of air to a seating 78 for a suitable spring-loaded valve, incorporating a ball 80. The spring 81 is loaded by screw 82 which threadably engages member 75. Screw 82 is bored for the flow of air therethrough.

The housing 73 contains a groove itself containing a sealing ring 83 which engages hermetically with a cylindrical portion 84 of member 75. The portion 84 is flanked by smaller diameter portions 85, 86 the purposes of which will be explained hereinafter.

At the inner end of member 75 is a hollow shaft 88 screwed into member 75 as a locking follower to screw 82 and loaded by a spring 89 and nuts 90.

Member 75 contains a vent hole 92 communicating between the valve ball 80 and a bore in the housing 73.

The operating modes of the pressure controller are as follows:

The spring loaded valve ball 80 functions as a balanced valve, in which the pressure on its seating is determined by the force-difference between that exerted inwardly by the high pressure supply air on the seating area and outwardly by the sum of the tank pressure and that exerted by spring 81. When liquid is released from tank 15, the fall in pressure unbalances the equilibrium forces on the valve, which allow it to leave its seating. The resultant flow of high pressure air into the tank restores the outward air force component on the valve, which again closes on its seating. It is clear that the average tank pressure can be increased by retracting screw 82 and vice versa.

The sliding member 75 takes up a floating position within its sealing ring 83 according to the tank pressure opposed by spring 89. When the pressure is low, or zero, spring 89 causes member 75 to move inwardly and thus clear cylindrical section 84 from sealing ring 83. The reduced diameter of portion 85 breaks the seal with ring 83 and the tank then exhausts through vent hole 92. This property of the controller also permits the operator to manually discharge the tank by depressing member 75.

The rest-position of member 75, that is with the tank deflated, is fully inward and the tank cannot be accidently inflated without manually lifting member 75 into engagement with its sealing ring 83.

The upper limit of tank pressure, should valve ball 80, for example, become jammed, is set by spring 89 becoming compressed due to outward air pressure on the sliding member 75. The cylindrical sealing surface 84 of member 75 will then be moved away from sealing member 83 and become adjacent to the smaller diameter portion 86. The tank will then discharge its air through vent hole 92. This mode of operation provides a safety valve function for relief of over-pressure under abnormal conditions.

The invention can be varied in many ways. For example, the liquid actuating pump piston 44 can, if desired, have its pumping stroke actuated by air pressure behind piston 35, instead of spring 41. The valve 69 can be a reed valve or flap valve, or other known type of valve.

What is claimed is:

1. A secateur comprising a pair of blades,
means retaining the blades for shearing movement relative to each other,
actuating means coupled to respective said blades and operable to effect said shearing movement,
a conduit terminating at one end in a spray emitting nozzle, and means securing the conduit near its said end with respect to one of said blades,
and spray impelling means operatively coupled to said actuating means and operable to effect emission of liquid spray from said conduit and through said nozzle upon reversal of said actuating means to a blade resetting position.

2. A secateur according to claim 1 wherein said means retaining the blades for shearing movement comprise a hinge pin and said shearing movement is a pivotal movement.

3. A secateur according to claim 1 wherein said actuating means is a piston/cylinder combination, and further comprising an air valve fixed with respect to the cylinder of said combination, said conduit being an exhaust air conduit extending between said valve and said nozzle, there also being a pressure air conduit terminating in said valve, so arranged that in one position of said valve pressure air is introduced into said cylinder and in another position of said valve pressure air from said cylinder is exhausted through said nozzle.

4. A secateur according to claim 3 wherein said spray impelling means comprises a pump assembly, a liquid actuating pump piston in said pump assembly, means in the pump assembly operable to move said pump piston in a pumping stroke simultaneously with said exhaustion of pressure air through said nozzle, and a conduit extending between said pump assembly and said nozzle for the conveying of liquid displaced by said pump piston into the path of said air during said exhaustion.

5. A secateur according to claim 3 wherein said spray impelling means comprises a pump assembly having;
a body having thereon relatively large cylindrical walls defining an air cylinder and further cylindrical walls which are relatively small defining a liquid pumping cylinder,
a piston assembly with an air piston sealably and slidably engaging the air cylinder walls and a liquid actuating pump piston co-axial with the air piston co-operating with the pumping cylinder walls,
a spring urging the piston assembly in a liquid pumping stroke direction, and an air conduit extending between the cylinder of said piston/cylinder combination and said air cylinder operable to drive said air piston against said spring when pressure air is introduced into said piston/cylinder actuating means,
and a liquid conduit extending between said liquid pumping cylinder and said nozzle,
so constructed and arranged that when said air valve is actuated to effect said shearing movement of the secateur blades, said piston assembly moves to compress said spring and the liquid actuating pump piston to aspirate, but upon release of said air valve said spring drives said piston assembly in a liquid pumping stroke which displaces liquid into the air stream which exhausts through said nozzle.

6. A secateur according to claim 3 wherein said spray impelling means comprises a pump assembly, a liquid actuating pump piston in said pump assembly, means in the pump assembly operable to move said pump piston in a pumping stroke simultaneously with said exhaustion of pressure air through said nozzle,
said pump assembly comprising cylindrical walls defining a pumping cylinder, a conduit arranged for connection to a fluid containing tank opening into the pumping cylinder and associated with said pump piston to be uncovered thereby during its aspiration stroke,
a liquid conveying conduit extending between said pump assembly and said nozzle for the conveying of liquid displaced by said pump piston into the path of said air during said exhaustion, and
a spring loaded valve in said pump assembly operatively disposed between said pumping cylinder and liquid conveying conduit, arranged to open only upon pumping stroke movement of said pump piston.

7. A secateur according to claim 6, further comprising a pressure air tank, a liquid containing tank, a pressure air conduit extending from the pressure air tank to the air valve, a liquid conduit extending from the liquid tank to the pump assembly, and a pressure reducing valve between the air and liquid tanks.

8. A secateur comprising a hand piece and a pump assembly, the hand piece comprising a fixed blade, a pivoted blade, a pivot pin joining the blades for pivotal movement, an air actuated piston/cylinder combination operatively interconnecting the blades, an air valve arranged to control actuating of the piston/cylinder combination, and a conduit extending from the air valve to a spray emitting nozzle on the fixed blade,
the pump assembly comprising a liquid actuating pump, and means to operate a pumping stroke thereof when said air valve returns to a normal position after a shearing movement of the pivoted blade,
and a liquid conveying conduit between the pump assembly and the nozzle, so arranged that upon said return of the air valve, air exhausted from the piston/cylinder combination and liquid pumped by said pump are emitted from said nozzle as a spray.

* * * * *

UNITED STATES PATENT AND TRADEMARK OFFICE
CERTIFICATE OF CORRECTION

PATENT NO. : 4,219,963
DATED : September 2, 1980
INVENTOR(S) : Leslie Fred Mullett It is certified that error appears in the above—identified patent and that said Letters Patent is hereby corrected as shown below:

On the Title Page insert:

-- (30) Foreign Application Priority Data

June 14, 1977    Australia    PD0434    --.

Signed and Sealed this

Third Day of February 1981

[SEAL]

*Attest:*

RENE D. TEGTMEYER

*Attesting Officer*    *Acting Commissioner of Patents and Trademarks*